No. 717,605. PATENTED JAN. 6, 1903.
W. OESTERLEIN.
CUTTER AND TOOL GRINDER.
APPLICATION FILED JAN. 2, 1902.
NO MODEL. 2 SHEETS—SHEET 1.

Witnesses
C. W. Miles
Emma Lyford

Inventor
William Oesterlein
By Murray & Murray
Attorneys

No. 717,605. PATENTED JAN. 6, 1903.
W. OESTERLEIN.
CUTTER AND TOOL GRINDER.
APPLICATION FILED JAN. 2, 1902.
NO MODEL. 2 SHEETS—SHEET 2.
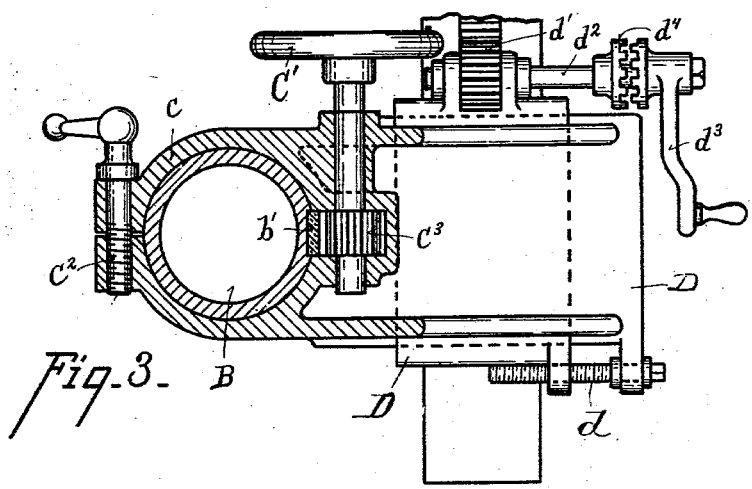
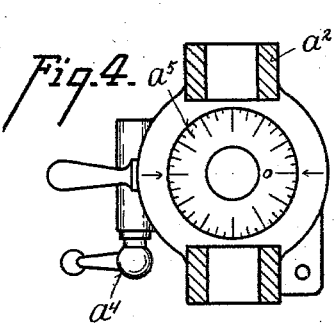
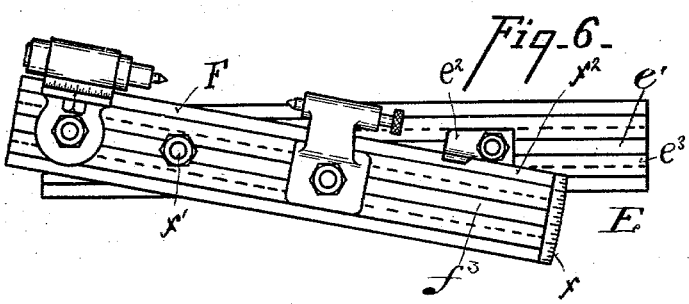
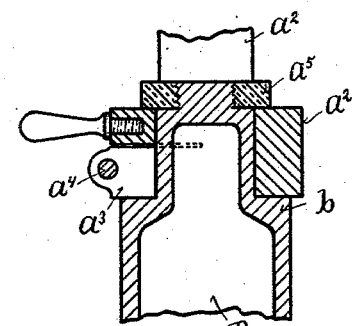
Witnesses
C. W. Miles
Emma Lyford
Inventor
William Oesterlein
By Murray & Murray
Attorneys

UNITED STATES PATENT OFFICE.

WILLIAM OESTERLEIN, OF CINCINNATI, OHIO, ASSIGNOR TO THE OESTERLEIN MACHINE COMPANY, OF CINCINNATI, OHIO, A CORPORATION OF OHIO.

CUTTER AND TOOL-GRINDER.

SPECIFICATION forming part of Letters Patent No. 717,605, dated January 6, 1903.

Application filed January 2, 1902. Serial No. 88,009. (No model.)

*To all whom it may concern:*

Be it known that I, WILLIAM OESTERLEIN, a citizen of the United States of America, and a resident of Cincinnati, in the county of Hamilton and State of Ohio, have invented certain new and useful Improvements in Cutters and Tool-Grinders, of which the following is a specification.

The object of my invention is a cutter and tool-grinder in which the necessity of revolving the table carrying the work is obviated, in which the handle for reciprocating the table may be always in the position most convenient for the workman, in which the table may be adjusted to any desired angle to and at any desired height relative to the cutting-tool, and which may be changed readily to adapt it to various kinds of work.

Figure 2:
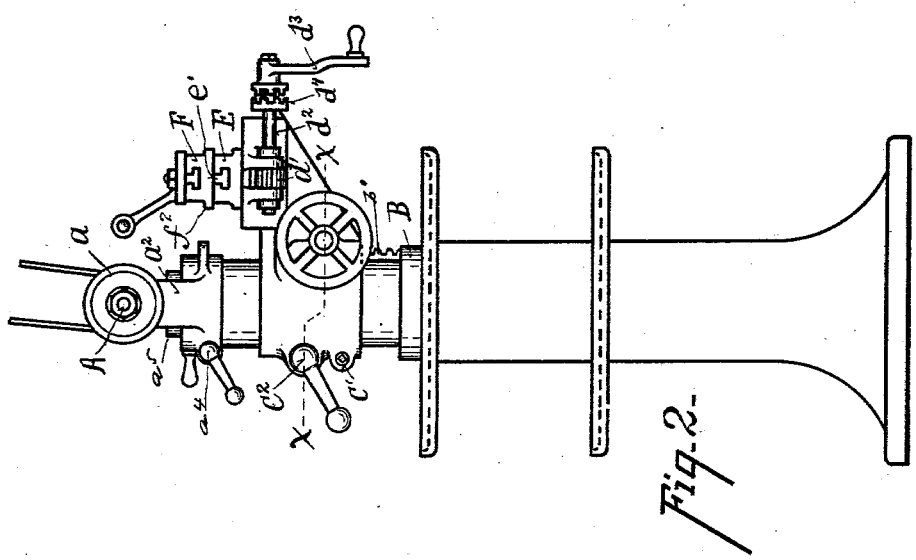
Figure 1:
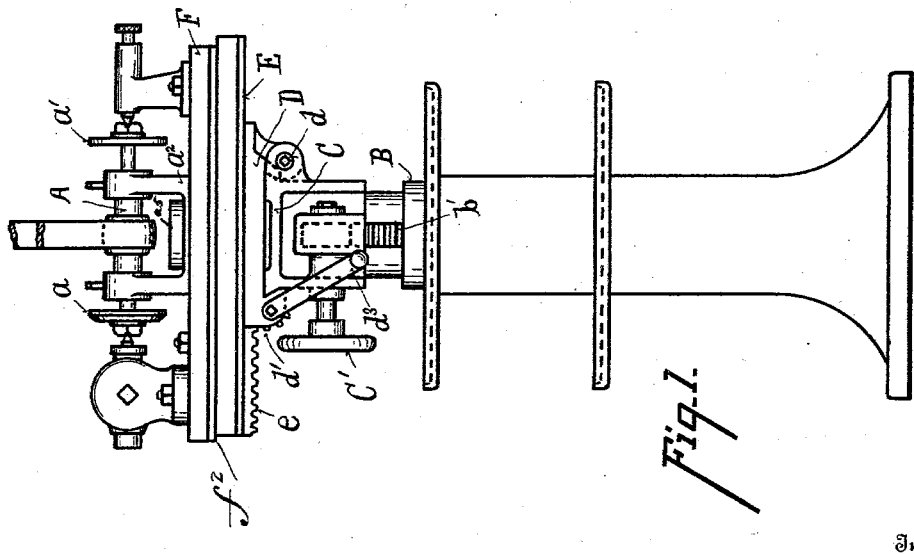

In the accompanying drawings, in which like parts are indicated by similar reference-letters wherever they occur throughout the various views, Figure 1 is a front elevation of a cutter and tool-grinder embodying my invention. Fig. 2 is a side elevation of the same. Fig. 3 is an inverted horizontal sectional view taken upon line $x\,x$ of Fig. 2 upon an enlarged scale. Fig. 4 is an enlarged detail plan view of the spindle-head, the journals for the spindle being shown in horizontal section. Fig. 5 is a detail central vertical sectional view of the same. Fig. 6 is a detail plan view of the table and the secondary table, showing the latter at an angle to the former.

Referring to the parts, spindle A, upon the ends of which are secured emery-wheels $a\,a'$, is mounted in a swivel-head $a^2$, which is rotatably mounted upon the upper end of a vertical column B, which has a shoulder $b$ at its upper end to receive the head, which is split at $a^3$ and has a clamping-screw $a^4$, by which the yoke may be fixed in position after it has been turned to the desired point. Swivel-head $a^2$ is held upon the end of column B by a cap $a^5$, which has graduations around its periphery to indicate at what angle to the table the spindle is held. Knee C, upon which saddle D is mounted, has formed integral with it a split collar $c$, which surrounds column B beneath swivel-head $a^2$ and has a tension-screw $c'$ to hold the knee at any position to which it may be moved and a clamping-screw $c^2$, by means of which the collar may be clamped upon the column. Knee C is raised by means of a vertical rack $b'$, secured to the column, and a pinion $c^3$, mounted upon a horizontal shaft secured to the knee and having a hand-wheel C' upon its end, by the turning of which the knee is raised. Saddle D may be moved upon knee C toward and away from swivel-head $a^2$ by a cross-feed screw $d$. Saddle D has a longitudinal way upon its top upon which a table E may be reciprocated by means of a pinion $d'$, secured upon a transverse shaft $d^2$, which is mounted upon the saddle, and a rack $e$, secured to the under side of table E. Shaft $d^2$ is rotated by means of a crank-arm $d^3$, which has a clutch $d^4$ for engaging the shaft, so that the arm may be adjusted readily to the position most convenient for the workman—as, for instance, at a certain position of table E the workman may prefer to have the crank-arm in its uppermost position. Without changing the position of the table the workman may remove the arm and reëngage it with the shaft $d^2$ in this uppermost position. Table E has in it a longitudinal T-way $e'$, and upon it is mounted a secondary table F, which has at a foot from its end $f$ a bolt $f'$, passing down through it into way $e'$. Table F has a horizontal flange $f^2$ running around it, which at end $f$ is graduated. Table E has a clamp $e^2$, sliding in way $e'$, for engaging flange $f^2$ and locking table F at any desired angle to table E, table E having a zero-line $e^3$ by placing the graduations upon the end of flange $f'$, in line with which table F may be adjusted to the desired angle per foot to E. Table F has likewise a longitudinal T-way to receive clamping-bolts for holding the work to be ground thereto.

It is seen that the spindle bearing the emery-wheels may readily be adjusted to and fixed at any angle to the table.

What I claim is—

1. In a cutter and tool-grinder in combination with a table for supporting the work, a vertical column having a shoulder near its upper end, a collar surrounding the shoulder and bearing journals for supporting a spindle, and graduations upon the collar and the column for adjusting the spindle at a desired angle to the work, substantially as shown and described.

2. In a cutter and tool-grinder the combination of a vertical column, a swivel-head upon top of the column, a spindle for the grinding-wheels mounted in the swivel-head, and a knee having a friction-collar upon the column for supporting the work, substantially as shown and described.

3. In a cutter and tool-grinder the combination of a vertical column, a swivel-head upon top of the column, a spindle for the grinding-wheels mounted in the swivel-head, a knee having a friction-collar surrounding the column, a rack upon the column and shaft and pinion upon the knee for engaging the rack, substantially as shown and described.

4. In a cutter and tool-grinder the combination of a vertical column, a swivel-head upon top of the column, a spindle for the grinding-wheels mounted in the swivel-head, a knee having a friction-collar surrounding the column, a table mounted upon the knee and means for carrying the table toward and away from the spindle, substantially as shown and described.

5. A cutter and tool-grinder having in combination with a spindle for the grinders a table adjacent the spindle having a T-way therein, a second table mounted upon said table having a flange upon its edge, a bolt passing through the second table into the T-way and a clamp sliding in the T-way to engage the flange to hold the second at an angle to the first table.

6. A cutter and tool-grinder having in combination with a spindle for the grinders a reciprocating table, a revolving shaft for actuating the same, a handle for revolving the shaft and a clutch for coupling the handle and the shaft whereby at any position of the table the handle may be held at any position, substantially as shown and described.

7. In a cutter and tool-grinder the combination of a vertical column, a swivel-head upon top of the column, a grinding-spindle mounted in the head, a sliding knee upon the column, a saddle mounted upon the knee and capable of a reciprocation toward and from the column, a table mounted upon the saddle and capable of a longitudinal movement thereon, means for reciprocating the table, a secondary table mounted upon the table and means for adjusting and securing it at an angle thereto, substantially as shown and described.

WILLIAM OESTERLEIN.

Witnesses:
W. F. MURRAY,
EMMA LYFORD.